(12) United States Patent
Grimaldo et al.

(10) Patent No.: US 11,279,215 B1
(45) Date of Patent: Mar. 22, 2022

(54) SUNROOF CATCH APPARATUS AND RELATED SUNROOF ASSEMBLIES FOR USE WITH VEHICLES

(71) Applicant: AISIN TECHNICAL CENTER OF AMERICA, INC., Northville, MI (US)

(72) Inventors: Jacob Grimaldo, Westland, MI (US); Micah Wedekind, Livonia, MI (US); Michael Mixon, Brighton, MI (US)

(73) Assignee: AISIN TECHNICAL CENTER OF AMERICA, INC., Northville, MI (US)

(*) Notice: Subject to any disclaimer, the term of this patent is extended or adjusted under 35 U.S.C. 154(b) by 0 days.

(21) Appl. No.: 17/011,113

(22) Filed: Sep. 3, 2020

(51) Int. Cl.
*B60J 7/19* (2006.01)
*B60J 7/043* (2006.01)
*B60J 7/053* (2006.01)
*E05F 5/00* (2017.01)

(52) U.S. Cl.
CPC .............. *B60J 7/192* (2013.01); *B60J 7/043* (2013.01); *E05F 5/003* (2013.01); *B60J 7/0435* (2013.01); *B60J 7/053* (2013.01)

(58) Field of Classification Search
CPC ....... B60J 7/00; B60J 7/02; B60J 7/024; B60J 7/043; B60J 7/053; B60J 7/057; B60J 7/192; B60J 7/0435; B60J 10/82; E05F 5/003; E05D 13/04

USPC ............................ 296/216.01–216.05, 216.08
See application file for complete search history.

(56) References Cited

U.S. PATENT DOCUMENTS

| 10,647,185 | B2 | 5/2020 | Grimaldo et al. | |
| 2001/0008347 | A1* | 7/2001 | Ito | B60J 7/05 296/221 |
| 2008/0303316 | A1* | 12/2008 | Mooney | B60J 7/0435 296/216.05 |
| 2020/0114741 | A1 | 4/2020 | Katsura et al. | |

* cited by examiner

*Primary Examiner* — Dennis H Pedder
*Assistant Examiner* — Joyce Eileen Hill
(74) *Attorney, Agent, or Firm* — Oblon, McClelland, Maier & Neustadt, L.L.P.

(57) ABSTRACT

An assembly for a sunroof can include a rail extending in a length direction of a vehicle, a bracket beneath a sunroof panel, an adapter coupled to the bracket, and a drive mechanism connected to a part of the bracket. Movement of the drive mechanism along the rail moves the bracket between a first position in which the sunroof is closed and a second position in which the sunroof is open. A catch device can slide along the rail relative to the adapter and includes a channel extending through a structure of the catch device to receive the adapter when the bracket is in the first position. When the adapter is in the channel, the structure is configured to engage the adapter to maintain the bracket in the first position and resist deflection of the bracket.

12 Claims, 11 Drawing Sheets

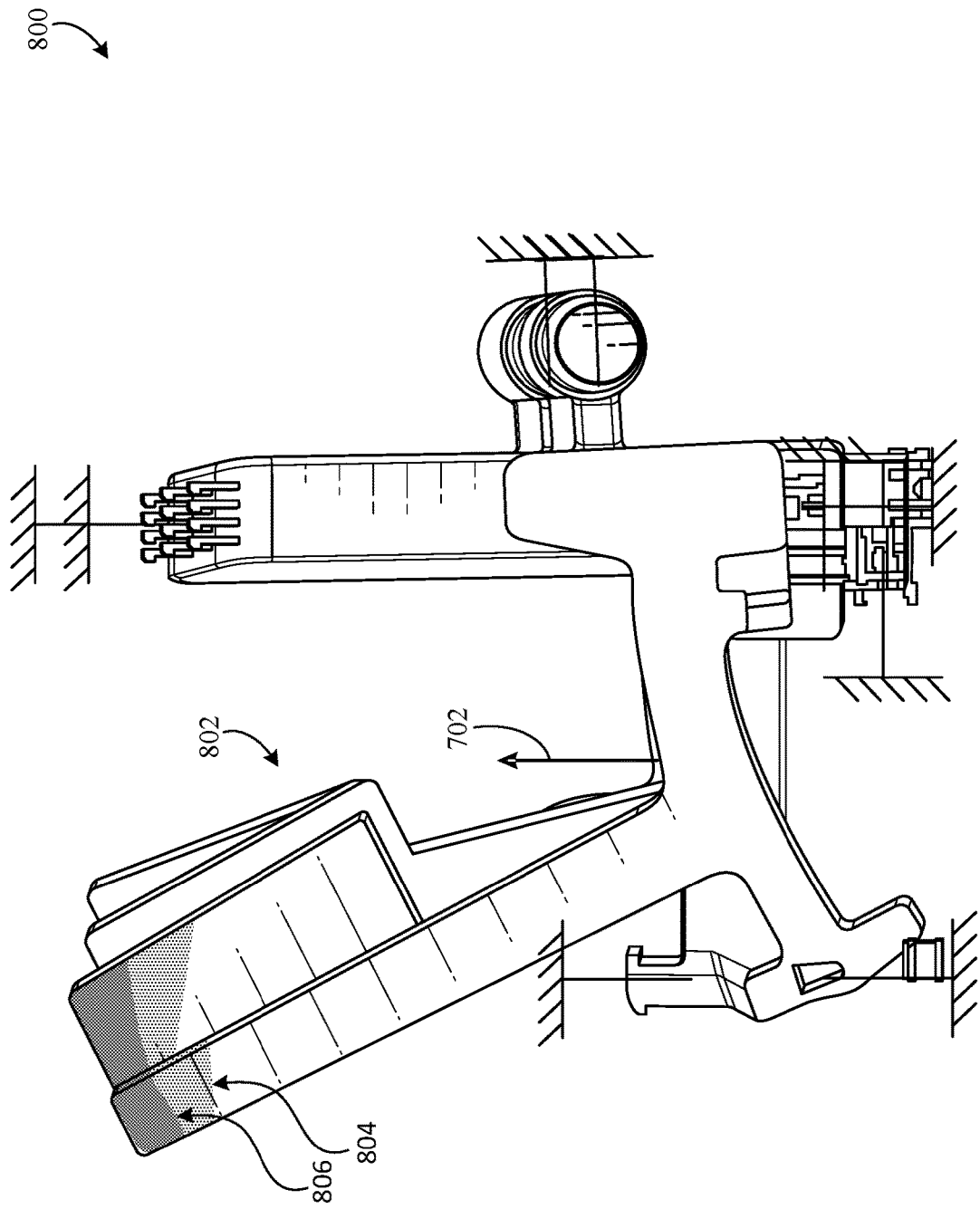

SUNROOF CATCH APPARATUS AND RELATED SUNROOF ASSEMBLIES FOR USE WITH VEHICLES

FIELD OF THE DISCLOSURE

This disclosure relates generally to vehicles and, more particularly, to sunroof catch apparatus and related sunroof assemblies for use with vehicles.

BACKGROUND

Motor vehicles typically employ sunroofs to improve comfort of vehicle occupants by allowing sunlight to enter a vehicle cabin through a sunroof panel (e.g., glass). Some vehicle sunroofs are configured to open and close, which may be desirable to the vehicle occupants (e.g., when the vehicle cabin is relatively hot). For example, a known vehicle sunroof may have a panel that can be moved (e.g., tilted, raised, lowered, etc.) in response to a sunroof motor generating output.

SUMMARY

An aspect of the present disclosure includes an assembly for a sunroof of a vehicle. The assembly can include a sunroof panel and a rail extending in a length direction of the vehicle. The rail includes multiple guide channels to receive and guide movable sunroof components. The assembly can also include a bracket beneath the sunroof panel and connected to a side portion of the sunroof panel. The bracket includes a first end that is a pivot point of the bracket and a second end opposite to the first end. The assembly can also include an adapter coupled to the bracket proximate to the second end and a drive mechanism slidably coupled to the rail and connected to a part of the bracket between the first end and the second end of the bracket. Movement of the drive mechanism along the rail moves the bracket between a first position in which the sunroof is closed and a second position in which the sunroof is open. The assembly can also include a catch device slidable along the rail relative to the adapter. The catch device includes a body portion connected to a sunroof cable and a structure attached to the body portion. The catch device also includes a channel that extends through the structure configured to receive the adapter when the bracket is in the first position. When the adapter is in the channel, the structure is configured to engage the adapter to maintain the bracket in the first position and resist deflection of the bracket.

The foregoing paragraphs have been provided by way of general introduction, and are not intended to limit the scope of the following claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8 is a detailed view of a different sunroof component and shows related translational displacement resulting from certain loading conditions.

The figures are not to scale. In general, the same reference numbers will be used throughout the drawing(s) and accompanying written description to refer to the same or like parts.

DETAILED DESCRIPTION

Figure 1:
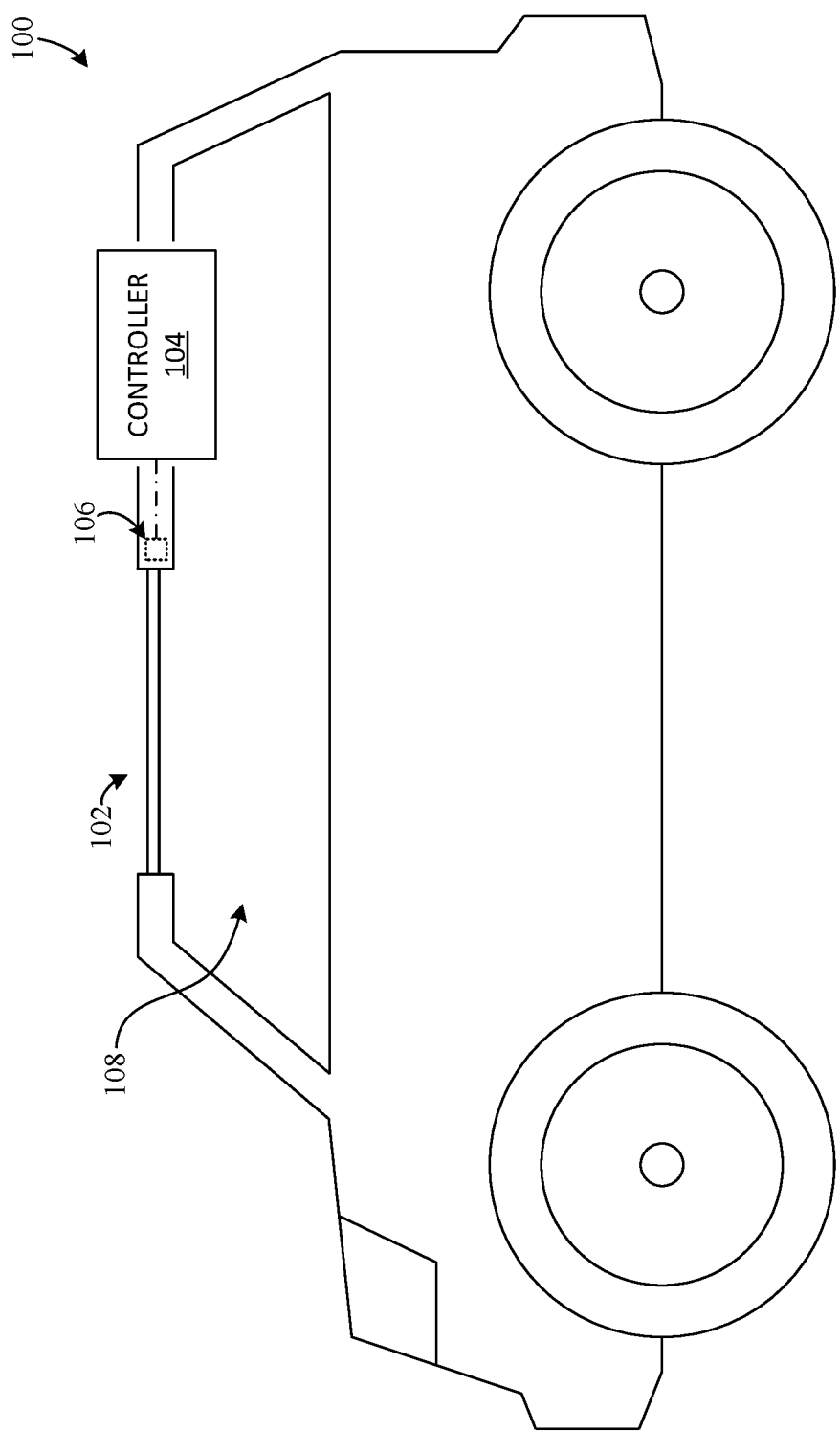
FIG. 1 is a view of an example vehicle in which examples disclosed herein can be implemented.

Some vehicle sunroofs have known single link systems that are structured to control movement of a glass panel based on motor output. For example, a known single link system can include a main bracket arranged along a side of the panel and fixedly coupled to the panel. Additionally, the known system can be provided with a slidable shoe and a rotatable link operatively coupled to the shoe and the main bracket holding the panel, where interaction of the shoe and the link rotates the link and the bracket. However, such a known single link system may not effectively hold the main bracket in place when the sunroof is closed. For example, in certain scenarios where relatively high forces are applied to the panel (e.g., when driving at high speeds or during a vehicle rollover), a rear part of the panel may substantially deflect due to flex in the movable components of the system. In particular, the forces applied to the panel may cause the main bracket to substantially lift upward and potentially break weatherstrip seals, thereby creating an air leak that could result in undesirable noises as well as a water leak that could damage other components of a vehicle.

Some single link systems are provided with known catching mechanism that aid in closing a sunroof panel during high-speed operations and restrict upward deflection of a bracket holding the sunroof panel when closed. Such a known catching mechanism may include a ledge that can slide against the bracket when the sunroof is closing. However, the bracket may slip off of the ledge under certain loading conditions due to an inherent structure of the catching mechanism, in turn allowing the bracket to flex and/or deflect upwards in a manner that could break the weatherstrip seals.

Sunroof catch apparatus and related sunroof assemblies for use with vehicles are disclosed. Examples disclosed herein provide a simple, light-weight, and cost-effective solution to advantageously secure a panel (e.g., glass) of a sunroof when the sunroof is closed. Some disclosed examples provide an example vehicle sunroof assembly (e.g., a single link assembly) that can include an exemplary bracket (e.g., a function bracket) and an exemplary catch device (e.g., a high speed catch device) for maintaining the bracket in a certain position after a closing operation of the sunroof is carried out. Generally speaking, the bracket is arranged alongside the panel and configured to carry and/or support the panel. The bracket can be adjusted between different positions by applying certain forces or loads to the bracket, which opens or closes the sunroof. For example, the bracket can be adjusted between any of a lowered position, a tilted position, a raised position, and the like via a slidable shoe and a rotatable link of the assembly that cooperatively interact with each other. As will be discussed in greater detail below, the disclosed catch device is configured to engage the bracket or part thereon (e.g., an adapter) while the bracket is in a certain or first position (e.g., the lowered positioned), thereby restricting deflection of the bracket and keeping the sunroof closed in certain scenarios of interest. In particular, the disclosed catch device is effective in maintaining the bracket in the first position when the vehicle is driving at relatively high speeds and/or during a vehicle rollover, where substantially high forces are applied to the panel held by the bracket.

The disclosed catch device can include a body portion slidably disposed in a sunroof track or rail and connected to a sunroof cable extending from the catch device to a sunroof motor. As such, the body portion and/or, more generally, the disclosed catch device can slide along the rail relative to the bracket. Further, the disclosed catch device also includes an example structure that can directly contact the bracket or an adapter thereon when the bracket is substantially in the first position to limit relative movement of the bracket. The disclosed structure is attached to the body portion of the catch device and positioned adjacent an end of the catch device. Additionally, a primary channel (e.g., a U-shaped channel) extending at least partially through the structure is sized and/or shaped to receive the adapter on the bracket. As previously mentioned, some examples disclosed herein provide an adapter, which is coupled to the bracket and may be positioned at or near an end of the bracket to better enable the disclosed device to catch, hold, and/or release the bracket. In particular, as the catch device is moved toward the bracket, the adapter or part thereof passes into the primary channel, where the structure can impart a certain load on the adapter that substantially maintains the bracket in the first position. The adapter may be provided with a hook-shaped feature that is insertable in the primary channel, which facilitates smooth engagement of the adapter and the structure.

In some examples, the catch device includes an example base that provides support to the structure and a primary wall of the catch device coupled to a cable receiver for holding the sunroof cable. The primary wall can slide through the rail and receive guidance therefrom during sunroof operation. The structure is coupled to the base and spaced from the primary wall, such that a secondary channel, different from the primary channel, exists in the catch device between the structure and the primary wall. In such examples, both sides of the structure are supported by the base, which evenly distributes forces in the catch device during high speed catch operation.

Additionally, in some examples, a cross-sectional area of the structure corresponding to the primary channel is substantially U-shaped, which allows for a more compact architecture (e.g., with respect to height and/or length of the catch device) while improving holding performance compared to the above-mentioned known catching mechanisms and/or single link systems. For example, a height of the structure can be substantially equal to a height of the primary wall to give additional clearance to surrounding sunroof components. In such examples, the structure can be provided with a first support portion (e.g., a relatively thin wall) and a second support portion (e.g., a relatively thin wall) that are coupled to the base of the catch device. Further, the structure can be provided with a catch portion connecting the first and second support portions together. The first and second support portions, together, can define an inner space in which the adapter on the bracket is insertable or positionable, where the catch portion is configured to impart the load on the adapter. In such examples, the first and second support portions are configured to resist a reactive load applied to the catch portion by the adapter.

When the adapter is between the first and second support portions of the structure, the first support portion and/or the second support portion can abut the adapter, thereby keeping the adapter in the primary channel and/or engaged with the catch portion. In this manner, the examples disclosed herein prevent the adapter from slipping off of the catch portion in the presence of relatively high external forces applied to the panel (e.g., until an opening operation of the sunroof is initiated), which would have otherwise been unattainable using the above-mentioned known catching mechanisms and/or single link systems. Additionally, to facilitate reducing and/or eliminating stress concentrations in the catch device resulting from the reactive load, some examples disclosed herein provide a particular ribbing structure arranged on the catch portion, the first support portion, and/or the second support portion.

FIG. 1 is a view of an example vehicle (e.g., a motor vehicle) 100 in which examples disclosed herein can be implemented. The vehicle 100 of FIG. 1 could be, for example, any of a car, a van, a truck, a sport utility vehicle (SUV), and like, or any other suitable motor vehicle. According to the illustrated example of FIG. 1, the vehicle 100 includes an example sunroof 102, an example controller 104, and one or more example motors 106. The controller of FIG. 1 is structured and/or configured to control the motor(s) 106 to change a state of the sunroof 102, for example, from a first state (e.g., a closed state) to a second state (e.g., an open or vented state) or vice versa. In some examples, the controller 104 of FIG. 1 receives a user input from an input device (e.g., an in-vehicle button or switch accessible to an occupant in the vehicle 100) connected to the controller 104 and, in response, opens or closes the sunroof 102 via the motor(s) 106 and based on the user input.

The controller 104 of FIG. 1 can be implemented, for example, using one or more microcontrollers, one or more electronic control units (ECUs), and the like, any other suitable control circuitry, or a combination thereof. As such, the controller 104 may include at least one processor and a database in communication with the processor. The controller 104 is sometimes referred to as a sunroof controller and/or a vehicle controller. Additionally, the controller 104 is communicatively coupled to the motor(s) 106, for example, via a transmission or signal wire, a bus, radio frequency, etc. In some examples, the controller 104 provides electrical power and/or one or more control signals or commands to the motor(s) 106, thereby controlling the motor(s) 106 and/or an output thereof (e.g., a torque and/or a force). In other examples, the controller 104 receives (e.g., continuously and/or repeatedly) data from the motor(s) 106, such as positional data that may be indicative of a panel position and/or the state of the sunroof 102.

The controller 104 of FIG. 1 may also be communicatively coupled to an input device, which facilitates interactions between the controller 104 and a person or user. The input device may be positioned in the vehicle 100 such that a vehicle occupant can activate and/or provided an input to the input device. In some examples, the controller 104 receives input data from the input device corresponding to a certain sunroof state or panel position. In response to receiving the input data, the controller 104 processes the input data and/or directs the motor(s) 106 in accordance with the input data.

The sunroof 102 of FIG. 1 can be implemented, for example, using any of a panoramic sunroof, a pop-up sunroof, a sliding sunroof, a spoiler sunroof, and the like, or any other suitable vehicle sunroof. The sunroof 102 is sometimes referred to as a vehicle sunroof. In some examples, the sunroof 102 is structured and/or configured to open, close, vent, and/or change between different sunroof states, for examples, in response to the motor(s) 106 generating output. As such, the sunroof 102 may be provided with at least one movable panel (e.g., a glass panel) that can be tilted, raised, lowered, and the like. In such examples, when closed or in the first state, the sunroof 102 of FIG. 1 substantially isolates a cabin 108 of the vehicle 100 from an outside or external environment, such that external fluids (e.g., water, air, etc.) are prevented from flowing into the cabin 108 through the sunroof 102. Of course, light (e.g., sunlight) may be transmitted through the panel(s) of the sunroof 102 when the sunroof 102 is closed or in the first state. On the other hand, when open or in the second state, the sunroof 102 exposes the vehicle cabin 108 to the external environment, such that ambient air is permitted or enabled to flow into the vehicle cabin 108, which may be desired by a driver and/or vehicle occupant(s) in certain driving conditions.

The motor(s) 106 of FIG. 1 can be implemented, for example, using one or more electric motors. The motor(s) 106 are coupled to the sunroof 102 and/or supported by a sunroof component. Further, the motor(s) 106 may be communicatively coupled to the controller 104. In some examples, in response to receiving the power and/or the control signal(s) or command(s) from the controller 104, the motor(s) 106 cause the sunroof 102 to open, close, and/or change between the different sunroof states.

Figure 2A:
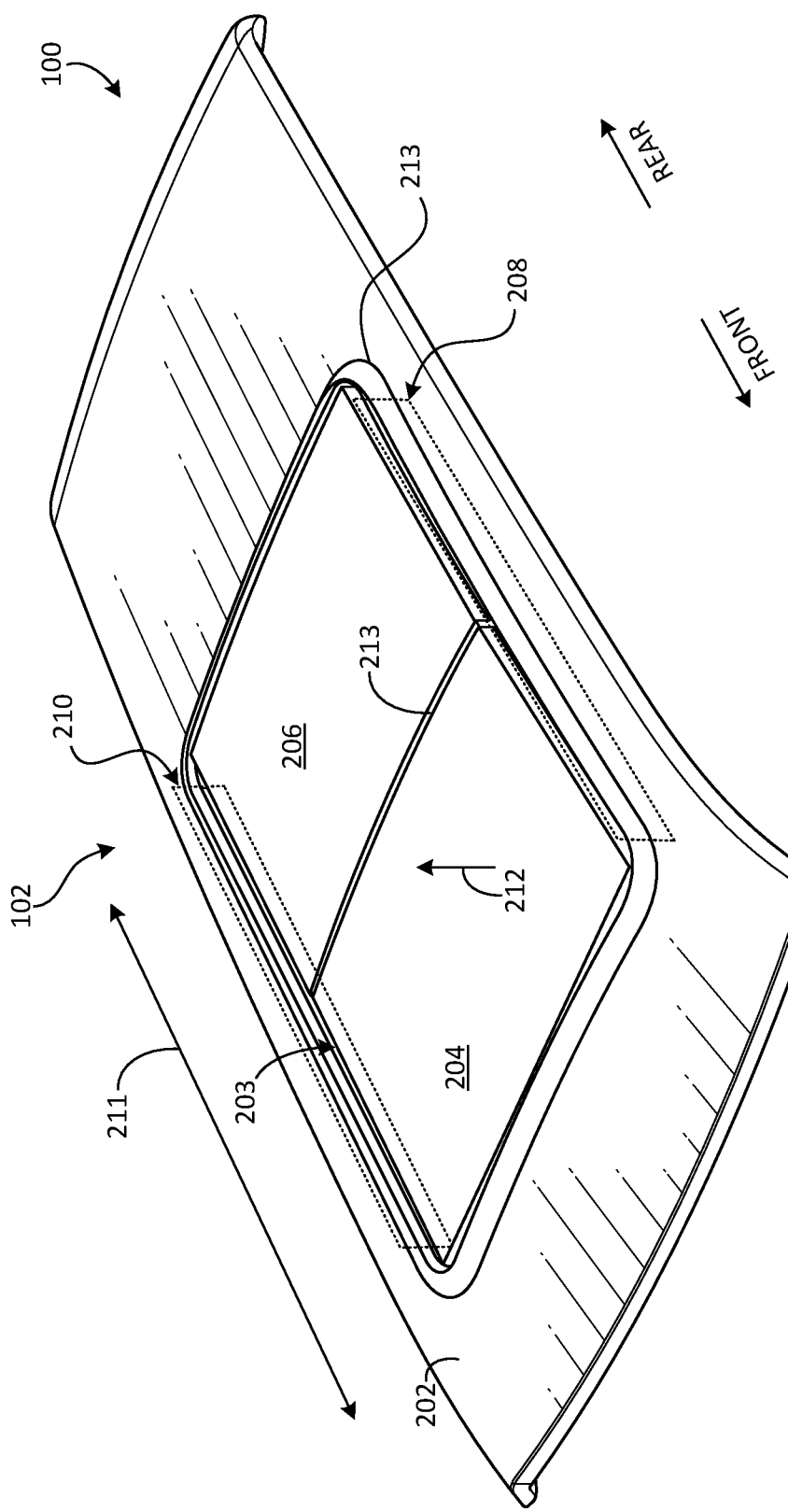
FIG. 2A is a partial-view of the example vehicle of FIG. 1 and shows an example vehicle sunroof in a first state.

FIG. 2A is a partial-view of the vehicle 100 and shows the sunroof 102 in the first state. The sunroof 102 of FIG. 2A is coupled to a roof 202 of the vehicle 100, for example, via one or more example fasteners and/or one or more example fastening methods or techniques. Further, the sunroof 102 of FIG. 2A or at least part thereof is disposed in an aperture 203 extending through the roof 202. The aperture 203 can be, for example, a relatively large opening in the roof 202 that is sized and/or shaped to receive one or more sunroof components. The sunroof 102 may be provided with one or more example panels (e.g., glass panels) 204, 206, two of which are shown in this example (i.e., a first panel 204 and a second panel 206). In FIG. 2A, the first panel 204 is movable and/or is configured to move between a first panel position (as shown in FIG. 2A) and a second panel position different from the first panel position, which changes the state of the sunroof 102. The first panel position can be, for example, a lowered position corresponding to the first state of the sunroof 102. On the other hand, the second panel position can be, for example, a raised position and/or a tilted position corresponding to the second state of the sunroof 102. In some examples, the first panel 204 can slide over or under the second panel 206 to open the sunroof 102 (e.g., see FIG. 2B). Additionally or alternatively, in some examples, the second panel 206 of FIG. 2A is likewise movable and/or configured to move between the first panel position and the second panel position.

As previously mentioned, the sunroof 102 of FIG. 2A is in the first state. As such, the first panel 204 of FIG. 2A is in the first panel position, and/or the second panel 206 of FIG. 2A is in the first panel position. To facilitate translating the panel(s) 204, 206 and/or controlling positions thereof, the sunroof 102 is provided with one or more exemplary assemblies 208, 210, two of which are shown. For example, in FIG. 2A, a first assembly (e.g., a single link assembly) 208 is associated with translating a first side of the first panel 204, while a second assembly (e.g., a single link assembly) 210 is associated with translating a second side of the first panel 204 opposite to the first side. As will be discussed in greater detail below, each of the assemblies 208, 210 include one or more particular sunroof components that function cooperatively to adjust a position and/or an orientation of the first panel 204 based on motor output. Such component(s) include, but are not limited to, any of an adjustable bracket, a catch device for the adjustable bracket, a slidable shoe, a rotatable link, a guide block, a guide track or rail, a cable, and the like, any other suitable component(s) associated with sunroof operation, or a combination thereof. For example, an adjustable bracket (e.g., see the example bracket 302 shown in FIGS. 3A, 3B, and 3C) may be arranged along a side of the first panel 204 and coupled to the side, where the adjustable bracket provides support to and/or holds the first panel 204 or at least the side thereof. In another example, a sunroof track or rail may extend in a length direction of the vehicle 100 across a certain dimension (e.g., a length) 211 of the sunroof 102 or at least part of the dimension 211, which provides one or more paths or guideways along which movable sunroof components can travel.

In some examples, when the motor(s) 106 generate output, the first and second assemblies 208, 210, together, advantageously guide the first panel 204 of FIG. 2A between the first and second panel positions. Additionally, when the motor(s) 106 cease generating the output, the first and second assemblies 208, 210, together, can effectively hold the first panel 204 in one of the first panel position, the second panel position, or a position between the first and second panel positions, where the first panel 204 is substantially immobile (e.g., until subsequent motor output is generated). In such examples, each assembly 208, 210 or at least part thereof is connected to the motor(s) 106 to receive the output therefrom, for example, via one or more cables, belts, chains, etc. that extend from the motor(s) 106 to a movable component of the assembly 208, 210. Additionally, the first assembly 208 and/or the second assembly 210 can be advantageously utilized to secure the first panel 204 in the presence of relatively high panel forces associated with causing panel or bracket deflection, as discussed further below.

In certain driving scenarios, one or more external forces (e.g., any of suction forces, impact forces, etc.) 212 may be applied to the first panel 204 while the sunroof 102 is closed or in the first state, which urges the first panel 204 to move and/or deflect along with the sunroof component(s) connected to the first panel 204. Such force(s) 212 can be generated, for example, as a result of the vehicle 100 driving at relatively high speeds and/or during a vehicle rollover event. In some examples, to protect weatherstrips 213 and/or other fluid seals or sealing devices of the sunroof 102, the first and second assemblies 208, 210, together, are structured to counteract the external force(s) 212, such that the panel or bracket deflection is substantially reduced and/or eliminated while the sunroof 102 is in the first state.

Figure 2B:
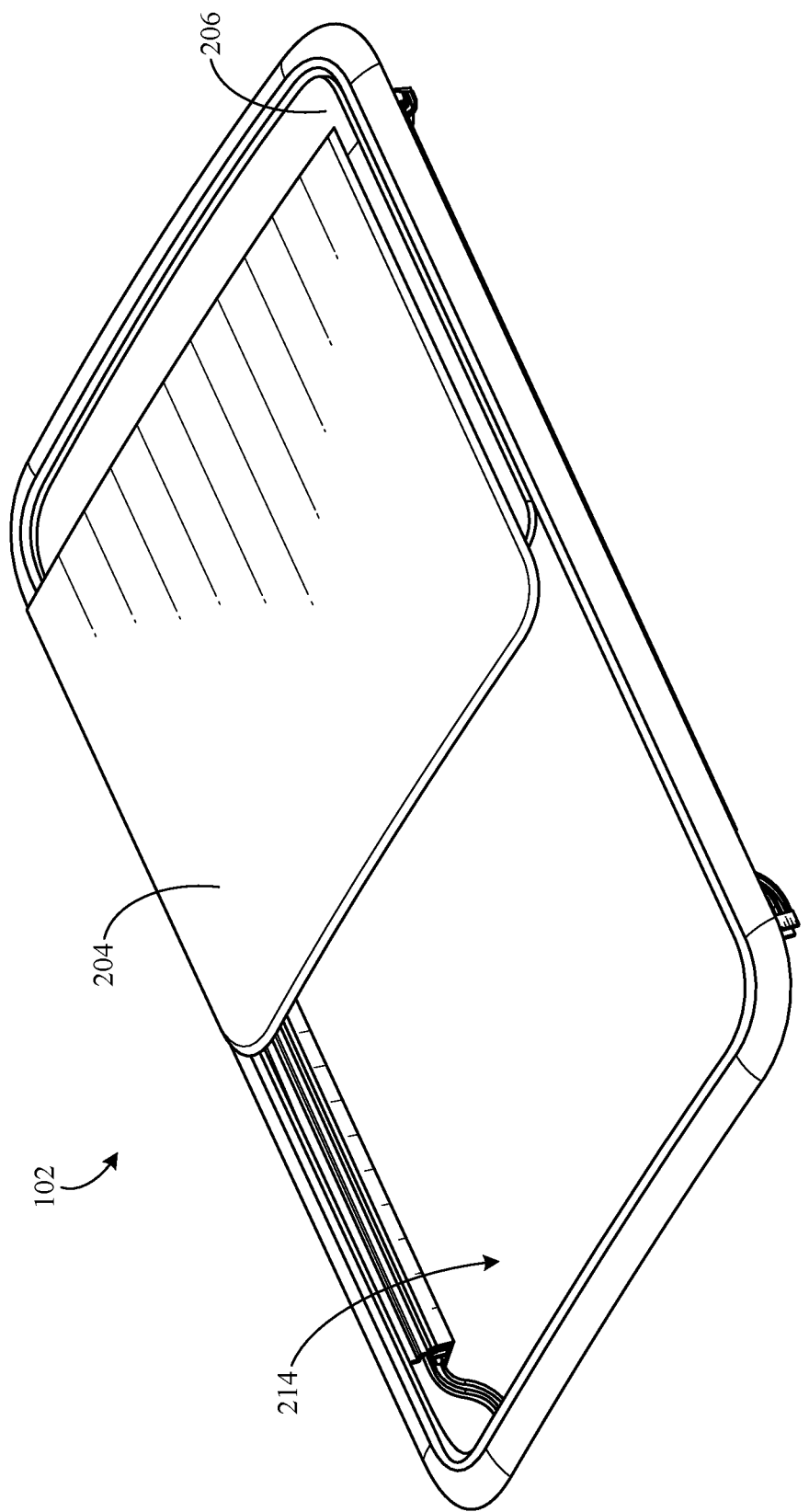
FIG. 2B is a view of the example vehicle sunroof of FIG. 2A and shows a different state of the example vehicle sunroof.

FIG. 2B is a view of the vehicle sunroof 102 of FIG. 2A and shows the second state of the vehicle sunroof 102. In contrast to the illustrated example of FIG. 2A, the first panel 204 of FIG. 2B is in the second panel position. In particular, the vehicle sunroof 102 of FIG. 2B substantially exposes the vehicle cabin 108 to an outside environment. For example, the fluid(s) may pass into the vehicle cabin 108 through an example opening 214 in the sunroof 102 resulting from the first panel 204 moving away from the first panel position. While FIG. 2B depicts the first and second panels 204, 206 overlapping and being substantially parallel relative to each other when the first panel 204 is in the second panel position, in some examples, the second panel position corresponds to a different or intermediate state (e.g., a vented state) of the sunroof 102, wherein the first panel 204 is adjacent and substantially tilted relative to the second panel 206.

Although FIGS. 2A and 2B depict aspects in connection with translating the first panel 204, in some examples, such aspects likewise apply to the second panel 206. For example, the second panel 206 can be similarly configured to move to provide an opening in the sunroof 102. In such examples, the first and second assemblies 208, 210 may be operatively coupled to the second panel 206. Alternatively, the sunroof 102 may be provided with one or more additional assemblies, different from the first and second assemblies 208, 210, that is/are operatively coupled to the second panel 206 to likewise guide and/or control movement thereof.

Figure 3A:
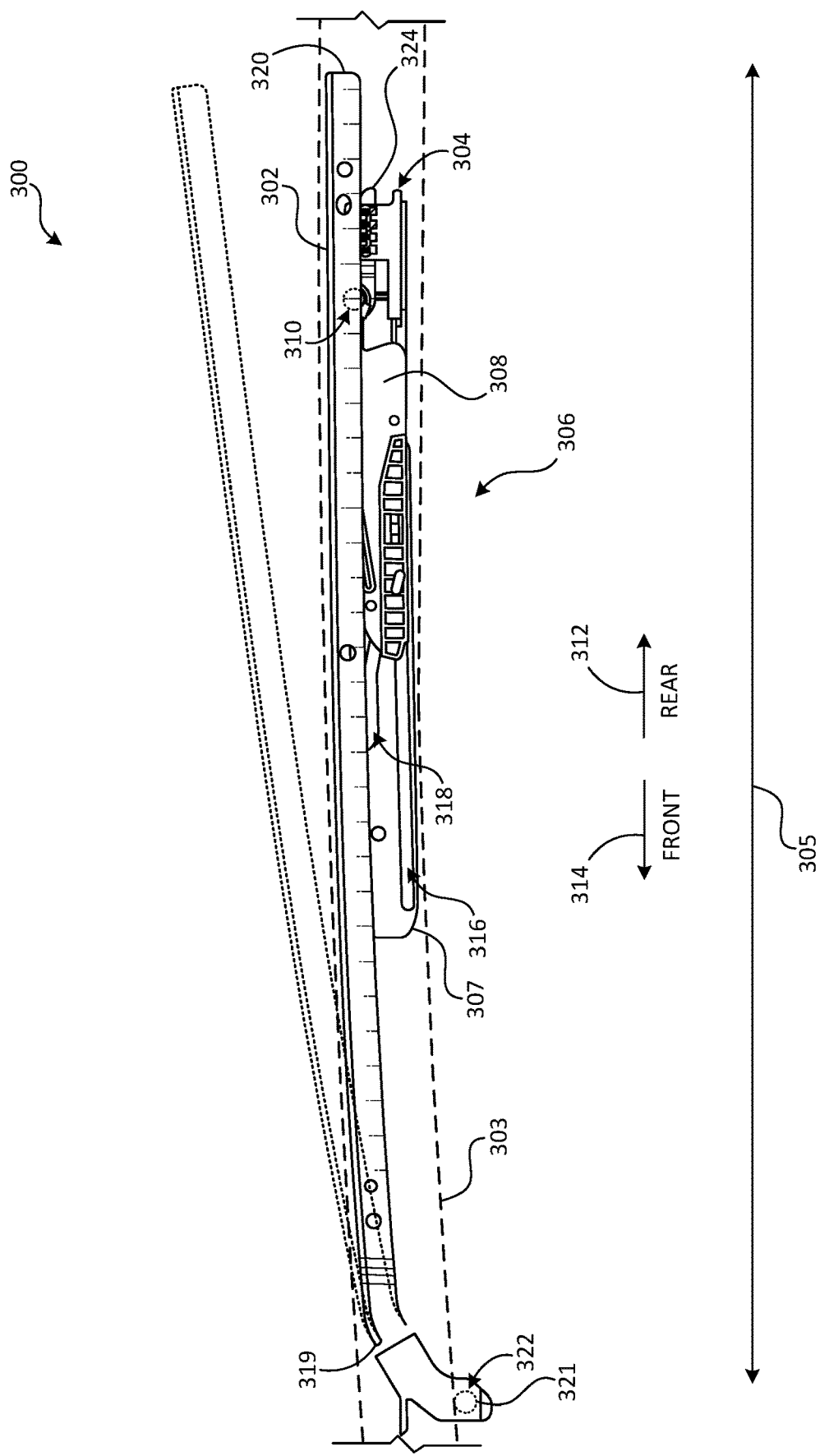
FIGS. 3A, 3B, and 3C are detailed views of an example sunroof assembly in accordance with the teachings of this disclosure.
Figure 3B:
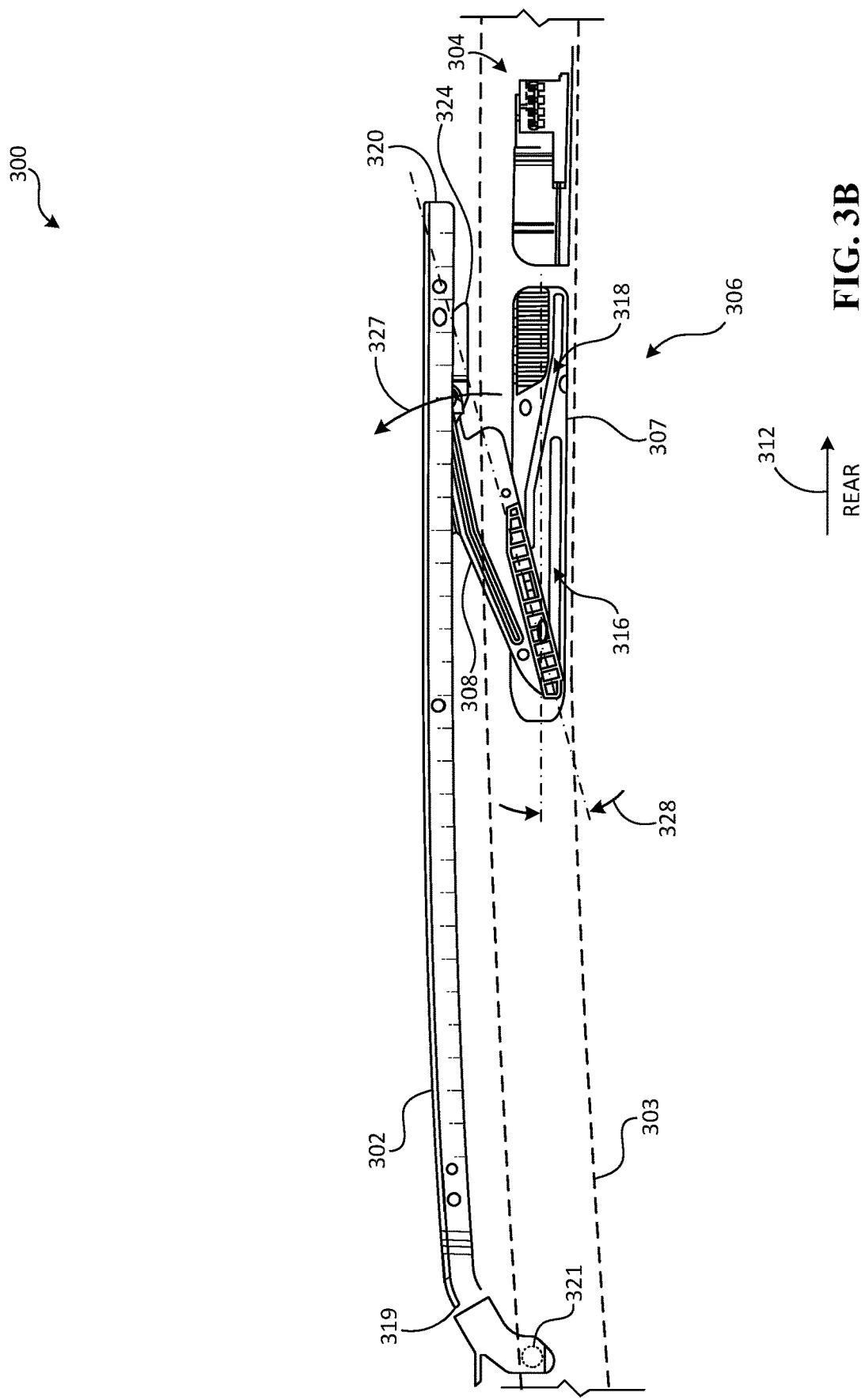
Figure 3C:
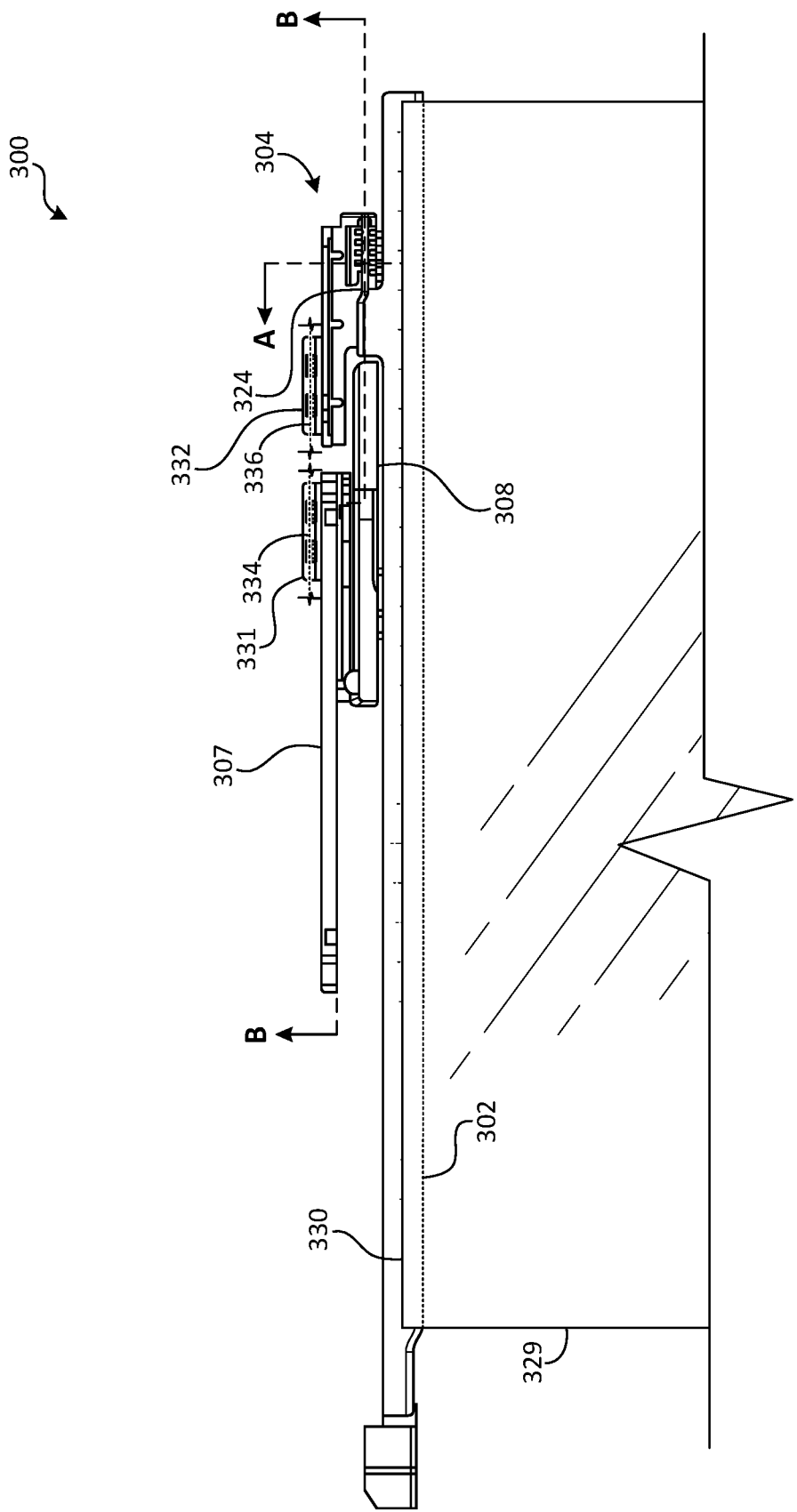

FIGS. 3A, 3B, and 3C are detailed views of an example assembly 300 for a sunroof of a vehicle in accordance with the teachings of this disclosure. In some examples, the assembly 300 of FIGS. 3A, 3B, 3C corresponds to and/or can be used to implement one or more of the assemblies previously described such as, for example, the first assembly 208 and/or the second assembly 210. According to the illustrated examples of FIGS. 3A, 3B, and 3C, the assembly 300, when assembled, forms and/or defines the sunroof 102 or at least part thereof. The assembly 300 shown is sometimes referred to as a vehicle sunroof assembly and/or a sunroof assembly.

Turning to FIG. 3A, a side-view of the assembly 300 is shown. The assembly 300 of FIG. 3A includes an example bracket (e.g., a function bracket of a sunroof) 302 supporting and/or configured to hold a sunroof panel, such as the first or second panel 204, 206. The bracket 302 of FIG. 3A is adjustable and sometimes referred to as an adjustable bracket. Accordingly, the bracket 302 can be adjusted between different positions and/or orientations, for example, by applying certain forces to the bracket 302 in a substantially controlled manner. In FIG. 3A, the bracket 302 is in a first position thereof (sometimes referred to as a first bracket position) such as, for example, a lowered or closed position that provides the first state of the sunroof 102 and/or the first panel position previously described. To effectively hold the bracket 302 in the first position thereof, the vehicle sunroof assembly 300 includes an example catch device (e.g., a high speed catch device) 304 that can connect to the bracket 302 (or a part thereon) and disconnect from the bracket 302, which will be discussed in greater detail below. In particular, the catch device 304, when connected to the bracket 302 (as shown in FIG. 3A), is effective in reducing and/or eliminating undesired panel or bracket movement typically associated with high vehicle speeds and/or certain driving events (e.g., a vehicle rollover), where the external force(s) 212 may act on the panel held by bracket 302.

To provide support and/or guidance to the bracket 302, the catch device 304, and/or any other appropriate sunroof component(s), the assembly 300 of FIG. 3A can include an example track or rail 303. The rail 303 of FIG. 3A is positionable on the roof 202 of the vehicle 100 and/or can be fixedly coupled to the roof, for example, via one or more fasteners and/or one or more fastening methods or techniques. In particular, the rail 303 of FIG. 3A forms and/or defines at least one guideway that extends across a length 305 of the rail 303 or at least part thereof to receive and guide one or more movable sunroof components, as discussed in greater detail below.

In some examples, the vehicle sunroof assembly 300 can be provided with an example drive mechanism 306 that is slidably coupled to the rail 303, which facilitates tilting, raising, lowering, and/or otherwise translating the bracket 302 and the panel held by the bracket 302. In particular, the drive mechanism 306 of FIG. 3A is structured such that movement of the drive mechanism 306 along the rail 303 adjusts or moves the bracket 302 between the first position and a second position (as represented by the dotted/dashed lines of FIG. 3A) different from the first position. The second position, which is sometimes referred to as a second bracket position, can be, for example, a tilted position of the bracket 302 that provides the intermediate state of the vehicle sunroof 102. Alternatively, the second position can be a raised or open position of the bracket 302 that provides the second state of the vehicle sunroof 102, as discussed further below in connection with FIG. 3B. Stated differently, in some examples, the first position of the bracket 302 is a position in which the sunroof 102 is open, while the second position of the bracket 302 is a position in which the sunroof 102 is closed.

In some examples, the drive mechanism 306 includes an example drive shoe 307 and an example link 308 that is operatively connected to the drive shoe 307 and the bracket 302. The link 308 of FIG. 3A is pivotably coupled to the bracket 302 such that the link 308 and the bracket 302 can pivot or rotate relative to each other about a first movable joint (e.g., a pin joint) 310. Additionally, the link 308 of FIG. 3A is slidably coupled to the drive shoe 307, for example, via a pin and slot connection defined by the link 308 and the drive shoe 307. In particular, the drive shoe 307 is movable relative to the link 308, thereby translating the link 308 and the bracket 302. The drive shoe 307 can be connected to the motor(s) 106 via a sunroof cable (and the like) extending from the drive shoe 307 to the motor(s) 106, where tension in the sunroof cable is utilized to pull the drive shoe 307. Each of the drive shoe 307 and the link 308 can be disposed in the rail 303 and/or configured to slide through the rail 303 to receive guidance from the rail 303.

In some examples, the drive shoe 307 of FIG. 3A can be moved relative to the link 308 in a first direction (e.g., a rear or rearward direction) 312 during a sunroof opening operation associated with opening the sunroof 102. For example, the drive shoe 307 can slide along the rail 303 from a first position relative to the link 308 (as shown in FIG. 3A) to a second position relative to the link 308 (shown in FIG. 3B) different from the first position. Conversely, the drive shoe 307 can be moved relative to the link 308 in a second direction (e.g., a front or forward direction) 314, opposite to the first direction 312, during a sunroof closing operation associated with closing the sunroof 102. In any case, the drive shoe 307 remains substantially engaged with the link 308 (e.g., the drive shoe 307 and the link 308 do not disconnect or separate during sunroof operation).

The link 308 of FIG. 3A can be implemented, for example, using a bracket and is sometimes referred to as a link bracket. In some examples, one or more guide pins are coupled to the link 308, each of which is slidably disposed in a slot or path extending through the drive shoe 307. For example, a first pin on the link 308 can slide through a first path 316 in the drive shoe 307, and/or a second pin on the same side of the link 308 (different from the first pin) can slide through a second path 318 in the drive shoe 307. The first path 316 may be separate from and/or adjacent to the second path 318. In particular, the paths 316, 318 of FIG. 3A are sized and/or shaped in connection with precisely controlling relative movement of the link 308. In some examples, movement of the drive shoe 307 relative to the link 308 particularly changes an orientation and/or a position of the link 308 and, consequently, changes an orientation and/or a position of the bracket 302 as well as the panel carried by the bracket 302. For example, as the pins on the link 308 travel through respective ones of the paths 316, 318, the drive shoe 307 imparts certain loads on the pins, thereby causing the link 308 to (a) rotate relative to an axis associated with pins and/or (b) slide in one of the first or second directions 312, 314.

As previously mentioned, the bracket 302 may pivot relative to the link 308 about the first movable joint 310. As such, a point at which the bracket 302 and part of the drive mechanism 306 connect corresponds to a first pivot point of the bracket 302. In FIG. 3A, the drive mechanism 306 is connected to a part of the bracket 302 (via the link 308) that is between a first end (e.g., a front end) 319 of the bracket 302 and a second end (e.g., a rear end) 320 of the bracket 302 opposite to the first end 319. Additionally, in some examples, the first end 319 of the bracket 302 is a second pivot point of the bracket 302 spaced from the first pivot point. In such examples, the vehicle sunroof assembly 300 includes an example guide structure (e.g., a front guide) attached to the bracket 302 and a pin 321 projecting from the guide structure. The pin 321 of FIG. 3A is configured to slidably engage a front guide block (not shown) coupled to the rail 303, thereby forming and/or defining a second movable joint (e.g., a pin joint) 322 about which the bracket 302 is pivotable. The front guide block may include a ramped guide channel therein that connects with a linear guide channel in the rail 303. For example, the pin 321 of FIG. 3A can slide through the front guide block from the ramped guide channel to the linear guide channel in the rail 303, which raises the first end 319 of the bracket 302. In FIG. 3A, each of the guide structure and/or the pin 321 is positioned substantially at or adjacent the first end 319 of the bracket 302.

According to the illustrated example of FIG. 3A, the assembly 300 includes an example adapter 324 coupled to the bracket 302, for example, via one or more fasteners and/or one or more fastening methods or techniques. The adapter 324 of FIG. 3A can be positioned at or proximate to the second end 320 of the bracket 302, which facilitates reducing loads applied to the catch device 304 by the adapter 324 during catch operation. As shown in FIG. 3A, the adapter 324 is spaced from the second end 320 of the bracket 302 by a relatively small or certain distance. In some examples, the adapter 324 is part of the bracket 302, and/or the bracket 302 and the adapter 324 define an integral or one-piece component. In particular, the adapter 324 of FIG. 3A can directly contact a certain area (e.g., an internal area) of the catch device 304 (e.g., when the external force(s) 212 is/are applied to the panel held by the bracket 302), thereby substantially maintaining the first position of the bracket 302 as well as the first state of the sunroof 102.

Similar to the drive shoe 307, the catch device 304 is movable relative to the link 308 and, in particular, relative to the bracket 302 and/or the adapter 324 thereon. For example, the catch device 304 can slide along the rail 303 from a first position relative to the adapter 324 (as shown in FIG. 3A) to a second position relative to the adapter 324 (shown in FIG. 3B) different from the first position. The first position of the catch device 304 can be an engaged position in which the catch device 304 and the adapter 324 are substantially engaged with each other, while the second position of the catch device 304 can be a disengaged position in which the catch device 304 and the adapter 324 are disengaged and/or separated from each other. Additionally or alternatively, the first position of the catch device 304 can be a position in which the adapter 324 is inserted or positioned in the catch device 304. In any case, the catch device 304 is connected to the motor(s) 106 via a sunroof cable (and the like) extending from the catch device 304 to the motor(s) 106, where tension in the sunroof cable can be utilized to pull the catch device 304. In such examples, the catch device 304 can be moved relative to the adapter 324 (a) in the first direction 312 during the sunroof opening operation and/or (b) in the second direction 314 during the sunroof closing operation. Further, the catch device 304 and the drive shoe 307 can be configured to move cooperatively together or in tandem during sunroof operation.

Turning to FIG. 3B, another side-view of the vehicle sunroof assembly 300 is shown. In FIG. 3B, the bracket 302 is in the second bracket position thereof to provide the second state of the sunroof 102. In contrast to the illustrated example of FIG. 3A, the drive shoe 307 moved from the first position to the second position relative to the link 308, which changed the orientation of the link 308. For example, during the sunroof opening operation, relative movement of the drive shoe 307 in the first direction 312 causes the link 308 to rotate relative to the drive shoe 307 in a first rotational direction 327 across a certain angle 328, which lifts at least the second end 320 bracket 302 and a corresponding end of the panel held by the bracket 302. Additionally, the catch device 304 of FIG. 3B is in the second position thereof, where the catch device 304 of FIG. 3B is separated from the bracket 302 and the adapter 324 thereon.

In some examples, when the pins on the link 308 reach ends of the respective paths 316, 318, the link 308 is substantially locked in place, where an orientation of the link 308 is maintained by the drive shoe 307 and/or the rail 303 (e.g., until the drive shoe 307 is moved in an opposite direction). In FIG. 3B, the link 308 is substantially tilted or inclined. Additionally, in such examples, while the link 308 is substantially locked or in a locked state, the drive shoe 307 is enabled to pull the link 308 and the bracket 302 in the first or second direction 312, 314 at least partially across the length 305 of the rail 303.

In FIG. 3B, the drive mechanism 306 is interposed between the bracket 302 and the rail 303, which provides support to the bracket 302 or at least the second end 320 of the bracket 302. Whereas the pin 321 associated with the first end 319 of the bracket 302 is slidably engaged with rail 303 and positioned in a certain guide channel in the rail 303, which provides support to the first end 319 of the bracket 302. As such, the bracket 302 of FIG. 3B can be substantially supported by the rail 303 and the drive mechanism 306.

Turning to FIG. 3C, a top-view of the vehicle sunroof assembly 300 is shown. In particular, FIG. 3C shows relative positioning associated with the bracket 302, the catch device 304, the drive shoe 307, the link 308, and the adapter 324, according to at least one implementation of the vehicle sunroof assembly 300 disclosed herein. According to the illustrated example of FIG. 3C, the assembly 300 is provided with an example sunroof panel (e.g., glass) 329 that is held by the bracket 302, which may correspond to the first or second panel 204, 206 previously described. The bracket 302 of FIG. 3C is arranged beneath the sunroof panel 329 and can extend at least partially across a length of the sunroof panel 329. Additionally, the bracket 302 is connected to a side portion 330 of the sunroof panel 329, for example, directly and/or via one or more intermediate components interposed between the bracket 302 and the sunroof panel 329, such that the bracket 302 provides support to the side portion 330. In FIG. 3C, the side portion 330 of the sunroof panel 329 can include an edge of the sunroof panel 329 or an area adjacent the edge that extends across the length of the sunroof panel 329.

In some examples, the drive shoe 307 is provided with a first receiver (e.g., a cable receiver) 331, which facilitates connecting the drive shoe 307 to means for transmitting energy from the motor(s) 106 to the drive shoe 307, such as a cable, a belt, a chain, and the like. Additionally or alternatively, the catch device 304 is provided with a second receiver (e.g., a cable receiver) 332, which similarly facilitates connecting the catch device 304 to means for transmitting energy from the motor(s) 106 to the catch device 304. For example, the first receiver 331 can connect the drive shoe 307 to a first sunroof cable 334 extending from the first receiver 331 to the motor(s) 106, and/or the second receiver 332 can connect the catch device 304 to a second sunroof cable 336 extending from the second receiver 332 to the motor(s) 106. In some examples, the catch device 304 and the drive shoe 307 are connected to the same cable.

Figure 4:
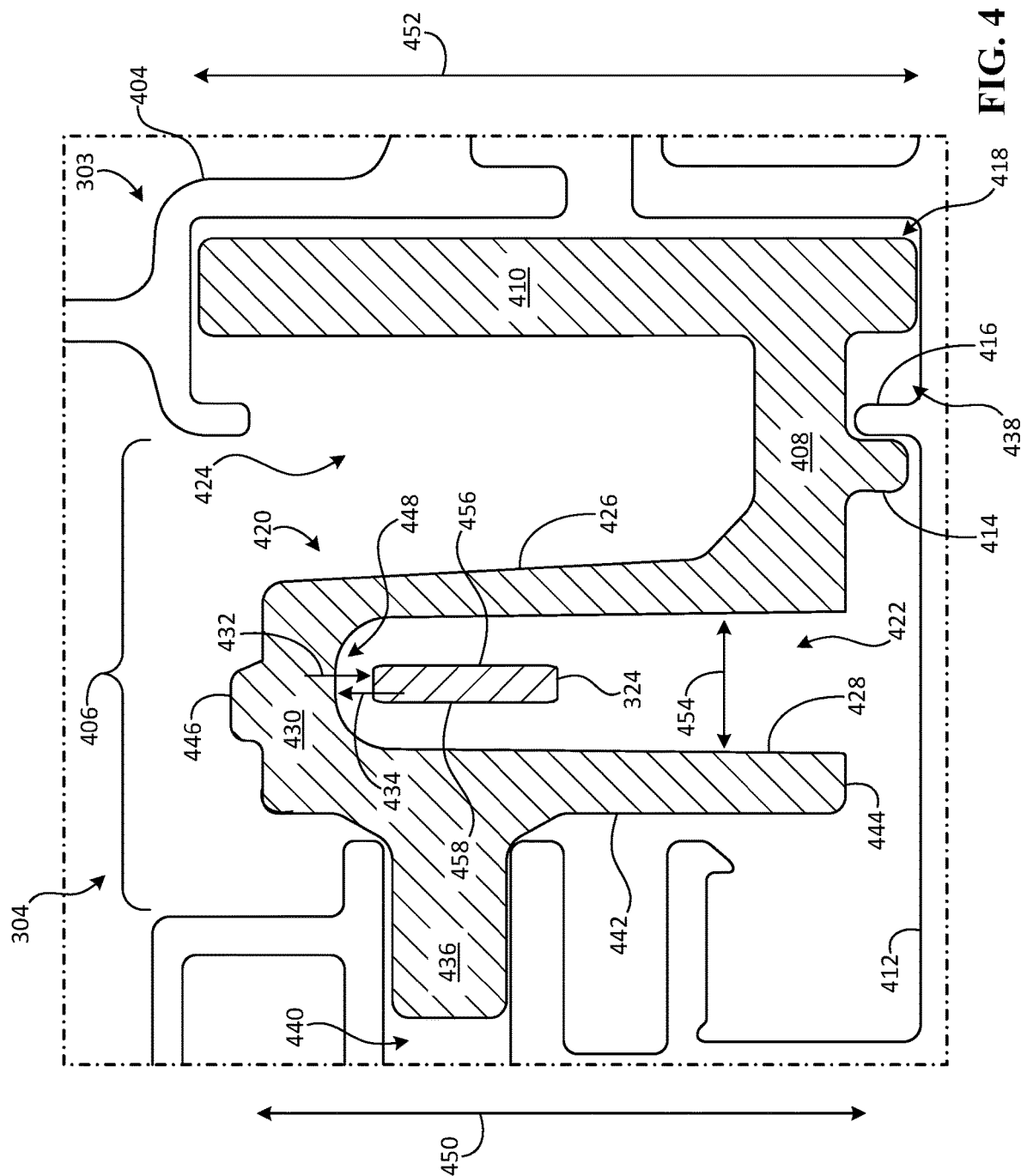
FIG. 4 is a partial cross-sectional view of the example sunroof assembly along line A-A of FIG. 3C and shows an example implementation thereof.

FIG. 4 is a partial cross-sectional view of the vehicle sunroof assembly 300 along line A-A of FIG. 3C and shows an example implementation thereof. According to the illustrated example of FIG. 4, the rail 303, which is sometimes referred to as a sunroof rail, may be arranged alongside the panel 329 held by the bracket 302 and may extend substantially across the dimension 211 of the sunroof 102 or at least part thereof. In some examples, the rail 303 of FIG. 4 extends in the length direction of the vehicle 100. In FIG. 4, the catch device 304 is in the rail 303 near the adapter 324 and slidably coupled to the rail 303, where the catch device 304 is slidable along the rail 303 relative to the adapter 324.

In some examples, the rail 303 of FIG. 4 includes a rail body (e.g., an extruded body or an extrusion) 404 and a primary guide channel 406 extending through the rail body 404 along an axis of the rail 303. That is, the primary guide channel 406 is in the rail 303 and arranged along a length of the rail 303 or at least part of the length. In such examples, the primary guide channel 406 is sized and/or shaped to receive the catch device 304 and allow the catch device 304 slide through the primary guide channel 406. As the catch device 304 slides through the primary guide channel 406, one or more inner surfaces of the rail 303 defining the primary guide channel 406 is/are configured to slidably engage the catch device 304, thereby substantially maintaining an orientation of the catch device 304 relative to the rail 303. Similarly, in some examples, the primary guide channel 406 is configured to slidably receive the drive mechanism 306 (e.g., including drive shoe 307 and/or the link 308) and/or the guide structure coupled to the first end 319 of the bracket 302.

To improve stability of the catch device 304 while sliding, the catch device 304 may be provided with an example base 408 and a primary wall 410 connected to the base 408. In some examples, the base 408 supports the primary wall 410 and/or one or more other features of the catch device 304. In FIG. 4, the base 408 and the primary wall 410 are coupled together, for example, via one or more fasteners and/or one or more fastening methods or techniques. Further, the primary wall 410 is angled relative to the base 408 such that an outer surface of the primary wall 410 and an outer surface of the base 408 define an angle (e.g., angle that is substantially 90 degrees). In particular, the primary wall 410 is configured to fit within the primary guide channel 406 or a certain space therein. Further, the base 408 can be slidably supported on a bottommost or lowermost (in the orientation of FIG. 4) surface 412 of the sunroof rail 303 that defines part of the primary guide channel 406. As shown in FIG. 4, a first protrusion 414 is projecting from the base 408, where the first protrusion 414 may slide against the lowermost surface 412 and/or a second protrusion 416 projecting from the lowermost surface 412.

Additionally or alternatively, in some examples, the catch device 304 includes an example body portion 418 that is slidably disposed in the sunroof rail 303, which may be substantially formed and/or defined by the base 408 and the primary wall 410. As such, the body portion 418 is movable relative to the bracket 302 and/or the adapter 324. The body portion 418 of the catch device 304 may be implemented using a one-piece component or multiple components that are assembled. The body portion 418 is connectable to at least one sunroof cable 334, 336, for example, via the second receiver 332. In any case, the base 408, the primary wall 410, and/or the body portion 418 of the catch device 304 is/are structured to sufficiently resist operating loads (e.g., any of tensile loads, axial loads, bending loads, and the like) applied to the catch device 304 during sunroof operation, such that plastic deformation or mechanical failure (e.g., fracturing, cracking, etc.) of the catch device 304 can be prevented.

According to the illustrated example of FIG. 4, the catch device 304 is provided with an example structure 420 that is associated with the bracket 302 and/or the adapter 324 thereon. In FIG. 4, the structure 420 of the catch device 304 is attached to the body portion 418. In particular, the catch device 304 includes an example primary channel (e.g., U-shaped channel) 422 in the structure 420 that is configured to receive the adapter 324 when the bracket 302 is in the first position thereof. The primary channel 422 of FIG. 4 extends at least partially or fully through the structure 420. In particular, the adapter 324 is insertable or positionable in the primary channel 422, for example, at a certain stage of the sunroof closing operation. More particularly, when the adapter 324 is in the primary channel 422 (as shown in FIG. 4), the structure 420 is configured to engage the adapter 324 to maintain the bracket 302 in the first position and/or restrict deflection (e.g., upward deflection) of the bracket 302.

In some examples, the structure 420 is configured to removably couple, via the adapter 324, to the bracket 302 when the bracket 302 is in the first position thereof. That is, when the bracket 302 is in the first position thereof, the adapter 324 enables structure 420 to effectively couple to the bracket 302 and decouple from the bracket 302. In such examples, the structure 420 and the adapter 324 shown in FIG. 4 may remain substantially engaged together, for example, until the catch device 304 is moved away from the adapter 324. In other examples, engagement of the structure 420 and the adapter 324 occurs only in response to the external force(s) 212 being applied to the panel held by the bracket 302. As shown in FIG. 4, a relatively small space or gap is between the adapter 324 and the structure 420.

The base 408 of FIG. 4 is connected between primary wall 410 and the structure 420, and the structure 420 of FIG. 4 is spaced from the primary wall 410 by a relatively small or certain distance, such that a secondary channel 424 of the catch device 304 exists different from the primary channel 422. Unlike the primary channel 422, the secondary channel 424 is external to the structure 420. In FIG. 4, the secondary channel 424 is between the structure 420 and the primary wall 410. Additionally, the primary and secondary channels 422, 424 are spaced and/or separated from each other. Further, the structure 420 of FIG. 4 may be provided with one or more particularly shaped cross-sectional areas that improve holding performance. As shown in FIG. 4, a certain cross-sectional area of the structure 420 is substantially U-shaped. Such a cross-sectional area can be located between opposite ends of the structure 420 along a plane (e.g., a frontal plane) and corresponds to part of the primary channel 422. Accordingly, in some examples, the primary channel 422 in the structure 420 is substantially U-shaped.

Further, in such examples, the structure 420 can include a first support portion 426 and a second support portion 428 that are coupled to the base 408 of the catch device 304. As shown in FIG. 4, the second support portion 428 is spaced from the first support portion 426, for example, by a relatively small or certain distance. The structure 420 can also include an example catch portion 430 connecting the first and second support portions 426, 428 together, which facilitates catching, holding, and/or releasing the adapter 324. The catch portion 430 of FIG. 4 may be located at a topmost (in the orientation of FIG. 4) portion of the U-shaped cross-sectional area corresponding to a closed side of the primary channel 422. Thus, in some examples, the structure 420 substantially surrounds the adapter 324 when the adapter 324 is in the primary channel 422, as shown in FIG. 4. In such examples, any of the first support portion 426, the second support portion 428, and/or the catch portion 430 may directly contact the adapter 324 to keep the adapter 324 in the primary channel 422 while the external force(s) 212 urge the bracket 302 to move.

In FIG. 4, the first support portion 426, the second support portion 428, and the catch portion 430, together, form and/or define the primary channel 422. More generally, the first and second support portions 426, 428, together, form and/or define an inner space in which the bracket 302 or the adapter 324 is positionable, where the inner space corresponds to the primary channel 422 or at least a portion thereof. Each of the first and second support portions 426, 428 can be implemented, for example, using a relatively thin wall and/or a wall-shaped structure. Accordingly, each of the first and second support portions 426, 428 is sometimes referred to as a wall and/or a secondary wall. On the other hand, in FIG. 4, the primary wall 410, the base 408, and the first support portion 426 form and/or define the secondary channel 424.

The catch portion 430 may be arranged and/or connected between the first and second support portions 426, 428. In some examples, the catch portion 430 of FIG. 4 is coupled to the first support portion 426 and the second support portion 426, for example, via one or more fasteners and/or one or more fastening methods or techniques. Further, the catch portion 430 can be positioned at or adjacent distal ends of the respective first and second support portions 426, 428. In particular, the catch portion 430 is configured to impart a first load 432 on the adapter 324 that maintains the bracket 302 in the first position thereof. Additionally, the first and second support portions 426, 428, together, are configured to resist a second load 434 applied to the catch portion 430 by the adapter 324. The adapter 324 may apply the second load 434 to a particular inner area of the catch portion 430 corresponding to the closed side of the primary channel 422. In particular, the second load 434 of FIG. 4 is transmittable through the first and second support portions 426, 428 from (a) the catch portion 430 to (b) the base 408 and/or an example guide 436 on the structure 420. As such, the catch device 304 can be provided with the guide 436 (and/or one or more similar guides), which can be coupled to the structure 420 via one or more fasteners and/or one or more fastening methods or techniques.

To better guide movable components of the sunroof assembly 300, the primary guide channel 406 in the rail 303 may be comprised of multiple channels. Stated differently, in some examples, the rail 303 defines multiple guide channels, each of which extends at least partially across the length 305 of the rail 303 to receive and guide a movable sunroof component or part thereof. As shown in FIG. 4, a first guide channel (e.g., a side channel) 438 of the multiple guide channels is sized and/or shaped to receive the primary wall 410 and, in some examples, the drive shoe 307. The base 408 of FIG. 4 extends out of the first guide channel 438 from the primary wall 410 to the structure 420. Additionally or alternatively, a second guide channel (e.g., a side channel) 440 of the multiple guide channels is sized and/or shaped to receive the guide 436. In FIG. 4, the guide 436 projects from a first side 442 of the structure 420. The first side 442 of the structure 420 faces away from the primary wall 410 and/or in an inboard direction. In particular, the guide 436 of FIG. 4 is configured to engage part of the sunroof rail 303 to further restrict deflection of the bracket 302. In some examples, one or more inner surfaces of the sunroof rail 303 defining the second guide channel 440 is/are configured to slide against the guide 436, which provides support to the catch device 304.

In FIG. 4, the guide 436 is positioned between a proximal portion 444 of the structure 420 and a distal portion 446 of the structure 420. The proximal portion 444 of the structure 420 is attached to the base 408, while the distal portion 446 of the structure 420 is spaced from the base 408 and/or positioned further away from the base 408. Additionally, in some examples, the guide 436 is proximate to or adjacent a contact area 448 of the structure 420 to which the adapter 324 applies the second load 434. As shown in FIG. 4, the guide 436 is positioned closer to the distal portion 446 than the proximal portion 444. By positioning the guide 436 within close proximity to the contact area 448, bending and/or twisting in the structure 420 (resulting from interaction of the guide 436 and the sunroof rail 303) is substantially prevented.

The structure 420 of FIG. 4, due to its inherent strength and/or rigidity, has a relatively short height 450, which gives additional clearance to surrounding components. As shown in FIG. 4, the height 450 of the structure is substantially equal to a height 452 of the primary wall 410. Further, a width 454 of the primary channel 422 in the structure 420 is larger than a width of the adapter 324 to facilitate insertion of the adapter 324 in the primary channel 422 and/or ensure an end of the adapter 324 passes into the primary channel 422 at a final stage of the sunroof closing operation. In some examples, a first side 456 of the adapter 324 facing the first support portion 426 abuts the first support portion 426. Additionally or alternatively, in some examples, a second side 458 of the adapter 324 facing the second support portion 428 abuts the second support portion 428. In such examples, the adapter 324 is prevented from slipping off of the catch portion 430 in the presence of the external force(s) 212 applied to the panel (e.g., until the sunroof opening operation is initiated).

In some examples, the catch device 304 is a one-piece component. In such examples, the base 408, the primary wall 410, the structure 420 (e.g., including the first and second support portions 426, 428 and the catch portion 430), and/or the guide 436 are integrally formed.

Figure 5A:
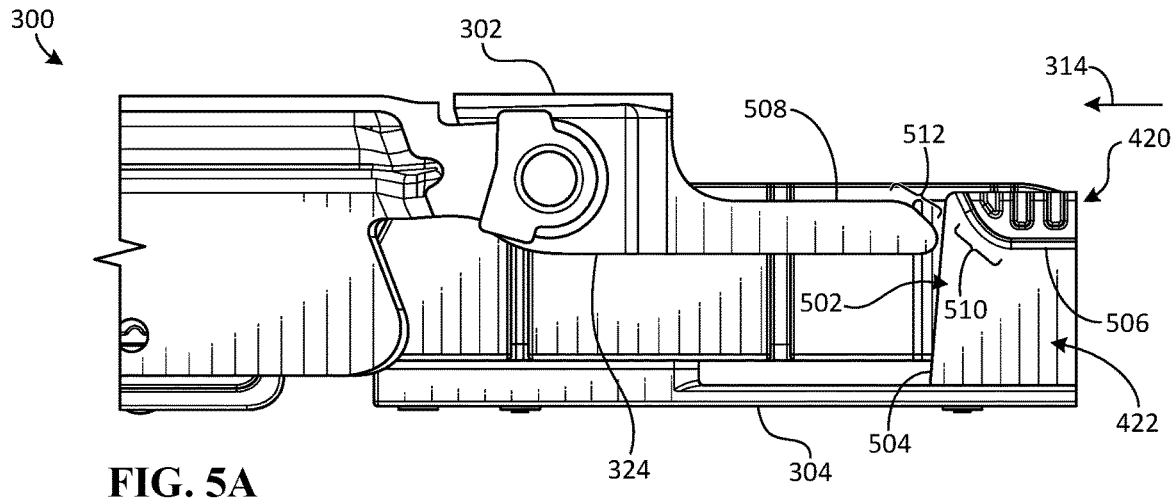
FIGS. 5A, 5B, and 5C are partial views of the example sunroof assembly along line B-B of FIG. 3C and show different stages of a sunroof closing operation.
Figure 5B:
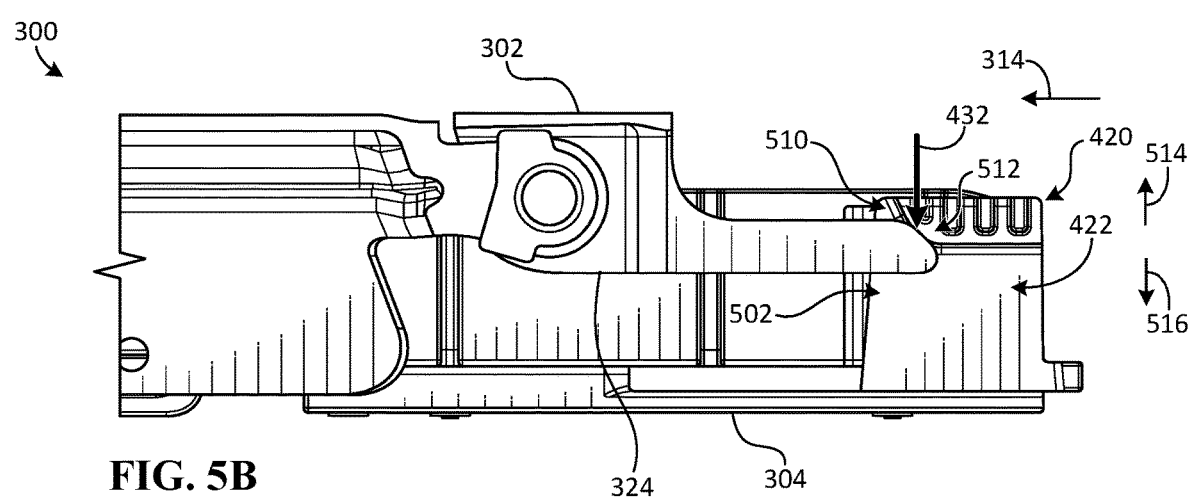
Figure 5C:
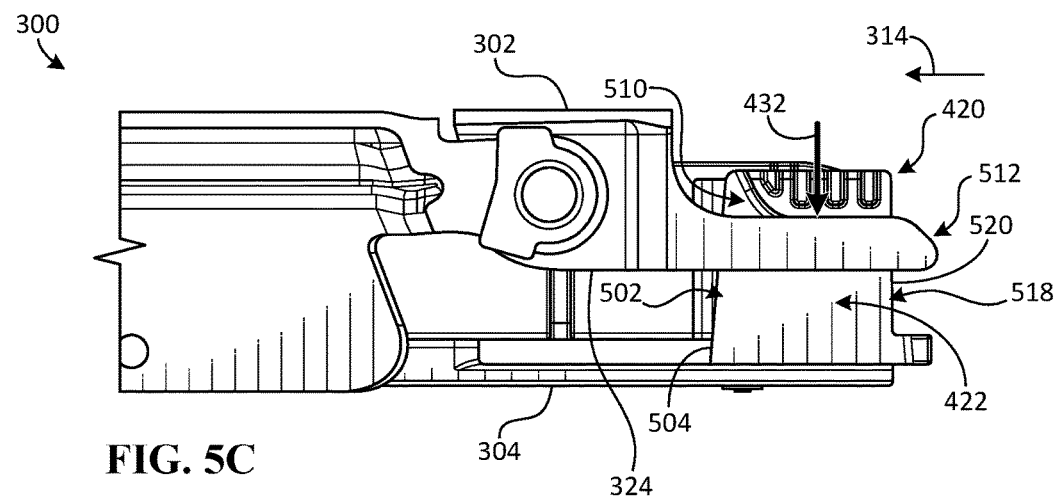

FIGS. 5A, 5B, and 5C are partial cross-sectional views of the vehicle sunroof assembly 300 along line B-B of FIG. 3C and show different example stages (e.g., final stages) of the previously described sunroof closing operation. According to the illustrated examples of FIGS. 5A, 5B, and 5C, the adjustable bracket 302 (a relatively small portion of which is shown) is substantially in the first position thereof, while the catch device 304 is being moved in the second direction 314 toward the adapter 324 such that the adapter 324 passes into the primary channel 422 of the structure 420.

Turning to FIG. 5A, the catch device 304 is approaching the adapter 324, where there is no physical interaction between bracket 302 and the catch device 304. The adapter 324 may pass into the primary channel 422 via a first opening 502 in a first end (e.g., a rearmost end) 504 of the structure 420. To facilitate smooth engagement and/or disengagement, the structure 420 can be provided with a first guide or contact surface 506 that is on part of the catch portion 430 internal to the structure 420. Further, a second guide or contact surface 508 may be provided on the adapter 324, which is associated with the first contact surface 506. In some examples, the first contact surface 506 is configured to slide against the second contact surface 508 on the adapter 324 as the adapter 324 passes into the primary channel 422. Additionally, each of the first contact surface 506 and/or the second contact surface 508 has an area that is substantially inclined or curved. In such examples, the first contact surface 506 can be provided with a first ramped area 510 configured to slidably engage and/or directly contact a second ramped area 512 of the second contact surface 508 to finely adjust a position of the bracket 302. In this manner, examples disclosed herein account for a certain positional variance of the bracket 302 that can result from the external force(s) 212 as the sunroof closing operation is completed.

Turning to FIG. 5B, the catch device 304 or the structure 420 thereof begins to engage the adapter 324 as the adapter 324 travels through the first opening 502. The external force(s) 212 previously described may be substantially prevalent at this stage of the sunroof closing operation depicted by FIG. 5B. In particular, the first and second loads 432, 434 are generated as a result. In FIG. 5B, the first ramped area 510 generates the first load 432 and/or imparts the first load 432 on the second ramped area 512.

In some examples (e.g., when the external force(s) 212 applied to the panel are relatively high and/or urge the bracket 302 to deflect upwardly), the first and second ramped areas 510, 512 of FIG. 5B slidably engage each other, wherein subsequent movement of the catch device 304 relative to the adapter 324 urges the adapter 324 and the bracket 302 to move, at least slightly, in a third direction (e.g., an upward direction) 514 and/or a fourth direction 516 opposite to the third direction 514. In contrast to the illustrated example of FIG. 5A, the bracket 302 and the adapter 324 have moved slightly in the fourth direction 516, for example, across a relatively small or certain distance. If the catch device 304 of FIG. 5B continues sliding in the second direction 314 (e.g., see FIG. 5C), the adapter 324 and the bracket 302 may move slightly further in the fourth direction 516 as the catch device 304 effectively locks the bracket 302 in the first position thereof. On the other hand, if the catch device 304 of FIG. 5B slides in the first direction 312 (e.g., during the opening operation of the sunroof 102), the adapter 324 and the bracket 302 may move slightly in the third direction 514 as the adapter 324 exits the primary channel 422 and disengages from the structure 420.

Turning to FIG. 5C, a relatively small part of the adapter 324 may exit the primary channel 422 through a second opening 518 in a second end (e.g., a front most end) 520 of the structure 420. The second end 520 of the structure 420 is opposite to the first end 504 of the structure 420. As such, in some examples, the primary channel 422 extends through the structure 420 from the first opening 502 to the second opening 518. Additionally or alternatively, in some examples, the inner space (defined by the first and second support portions 426, 428) extends through the structure 420 from the first opening 502 to the second opening 518. According to the illustrated example of FIG. 5C, the catch device 304 is in the first position thereof relative to the adapter 324. In contrast to the illustrated example of FIG. 5B, the first ramped area 510 is not engaged with the second ramped area 512. Further, as shown in FIG. 5C, the first and second ramped areas 510, 512 are separated and/or spaced from each other. On the other hand, a different area of the first contact surface 506 adjacent the first ramped area 510 is configured to directly contact a different area of the second contact surface 508 adjacent the second ramped area 512, which substantially limits relative movement of the adapter 324 and the bracket 302. Such contact occurs, for example, when the external force(s) 212 applied to the panel are relatively high and/or urge the bracket 302 to deflect (e.g., upwardly or in an upward direction).

Figure 6:
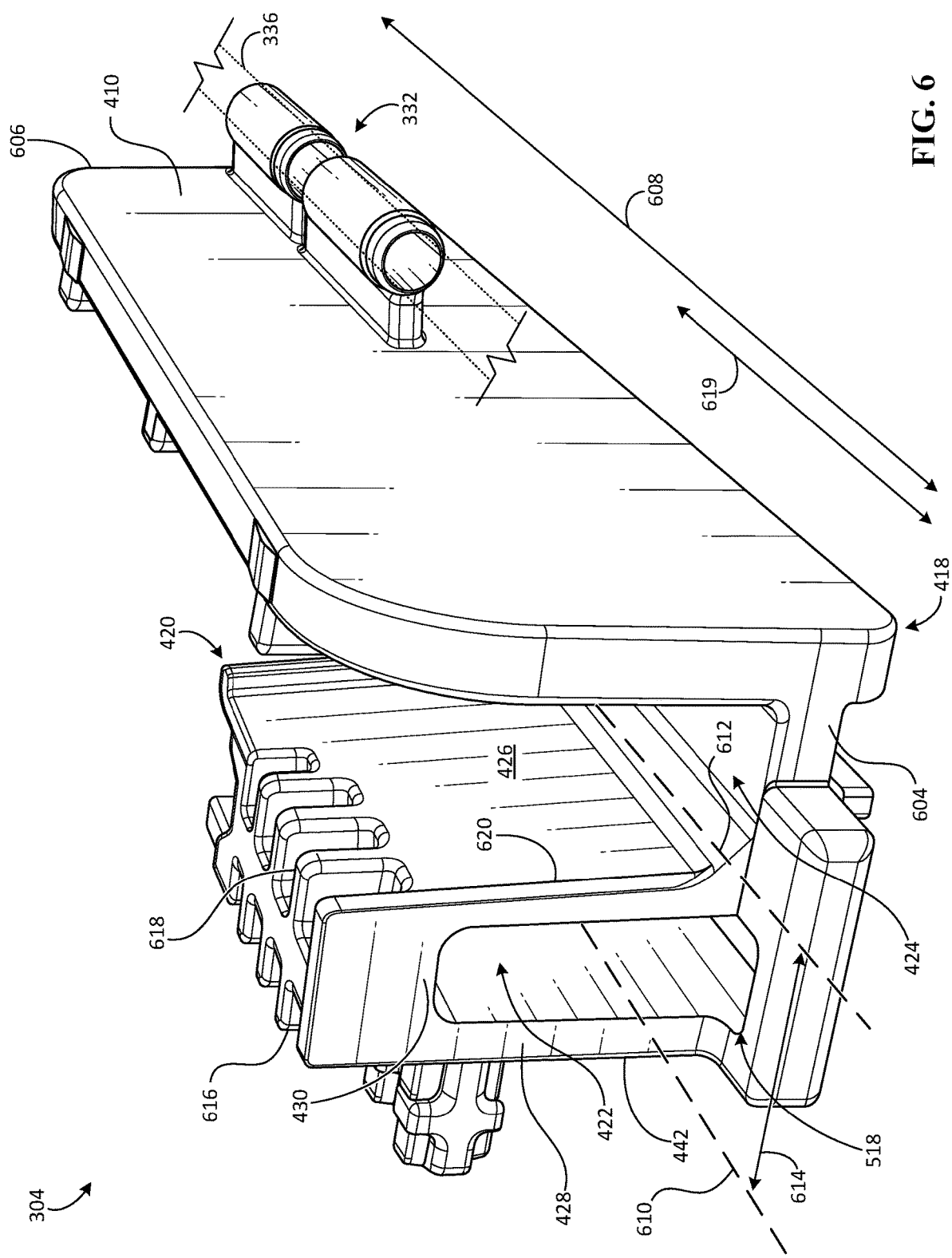
FIG. 6 is a detailed view of an example catch device in accordance with the teachings of this disclosure.

FIG. 6 is a detailed view of the catch device 304, wherein an example implementation of the catch device 304 is depicted. In FIG. 6, the second receiver 332 previously described is on the body portion 418. In some examples, the second receiver 332 is coupled to the primary wall 410, for example, via one or more fasteners and/or one or more fastening methods or techniques. The second receiver 332 of FIG. 6 is connected to, for example, at least one of the sunroof cables 334, 336. That is, the second receiver 332 of FIG. 6 is configured to receive and hold a sunroof cable 336 (and the like) such that energy is transmittable through the sunroof cable 336 from the motor(s) 106 to the second receiver 332. Accordingly, in some examples, the primary wall 410 and/or, more generally, the body portion 418 of FIG. 6 is/are connected to the sunroof cable 336 via the second receiver 332. By creating tension in the cable 336 of FIG. 6, the catch device 304 can be precisely moved along the sunroof rail 303 and/or relative to the bracket 302.

In FIG. 6, the first support portion 426, the second support portion 428, and part of the body portion 418 (e.g., the primary wall 410) are positioned adjacent the same or first end (e.g., a rearmost end) 604 of the catch device 304. The primary wall 410 of FIG. 6 extends away from the first end 604 toward or to a second end 606 of the catch device 304 opposite to the first end 604. As shown in FIG. 6, the primary wall 410 extends across a length 608 of the catch device 304. In some examples, the primary wall 410 of FIG. 6 substantially defines the length 608 of the catch device 304. On the other hand, the structure 420 of FIG. 6 extends across only part of the length 608 of the catch device 304.

According to the illustrated example of FIG. 6, the primary channel 422 of the catch device 304 extends through the structure 420 along a primary axis 610, while the secondary channel 424 of the catch device 304 extends between the body portion 418 and the structure 420 along a secondary axis 612 different from the primary axis 610. The primary and secondary axes 610, 612 may be substantially parallel relative to each other. Further, as shown in FIG. 6, the primary axis 610 is spaced from the secondary axis 612 by a relatively small or certain distance 614.

In some examples, the catch device 304 of FIG. 6 is configured to receive the adjustable bracket 302 or part thereon (e.g., the adapter 324) in the primary channel 422 to limit relative movement of the adjustable bracket 302 in the third direction 514. As previously described, the adapter 324 can be inserted or positioned in the primary channel 422, and the structure 420 can engage the adapter 324 and/or impart the first load 432 thereon. In FIG. 6, a portion of the primary channel 422 is exposed by the second opening 518. While the second opening 518 is shown, in some examples, the structure 420 of FIG. 6 is implemented differently, for example, having the first opening 502 but not the second opening 518. In such examples, the primary channel 422 may extend only partially into the structure 420 away from the first end 504 thereof.

In some examples, the structure 420 includes ribs 616, 618 arranged on the catch portion 430 to distribute stress and/or reduce stress concentrations in the structure 420 resulting from the second load 434 applied to the catch portion 430 by the adapter 324. As shown in FIG. 6, at least a first rib 616 is associated with the first side 442 of the structure 420, while at least second rib 618 is associated with a second side 620 of the structure 420 opposite to the first side 442. The second side 620 of the structure 420 faces the primary wall 410. The ribs 618, 618 of FIG. 6 are coupled to the structure 420, for example, via one or more fasteners and/or one or more fastening methods or techniques. Further, the ribs 616, 618 can be distributed substantially on a topmost (in the orientation of FIG. 6) portion of the structure 420 across a length 619 of the structure 420 or at least part thereof. In such examples, the ribs 616 can be formed and/or defined by any of the catch portion 430, the first support portion 426, and/or the second support portion 428.

Figure 7:
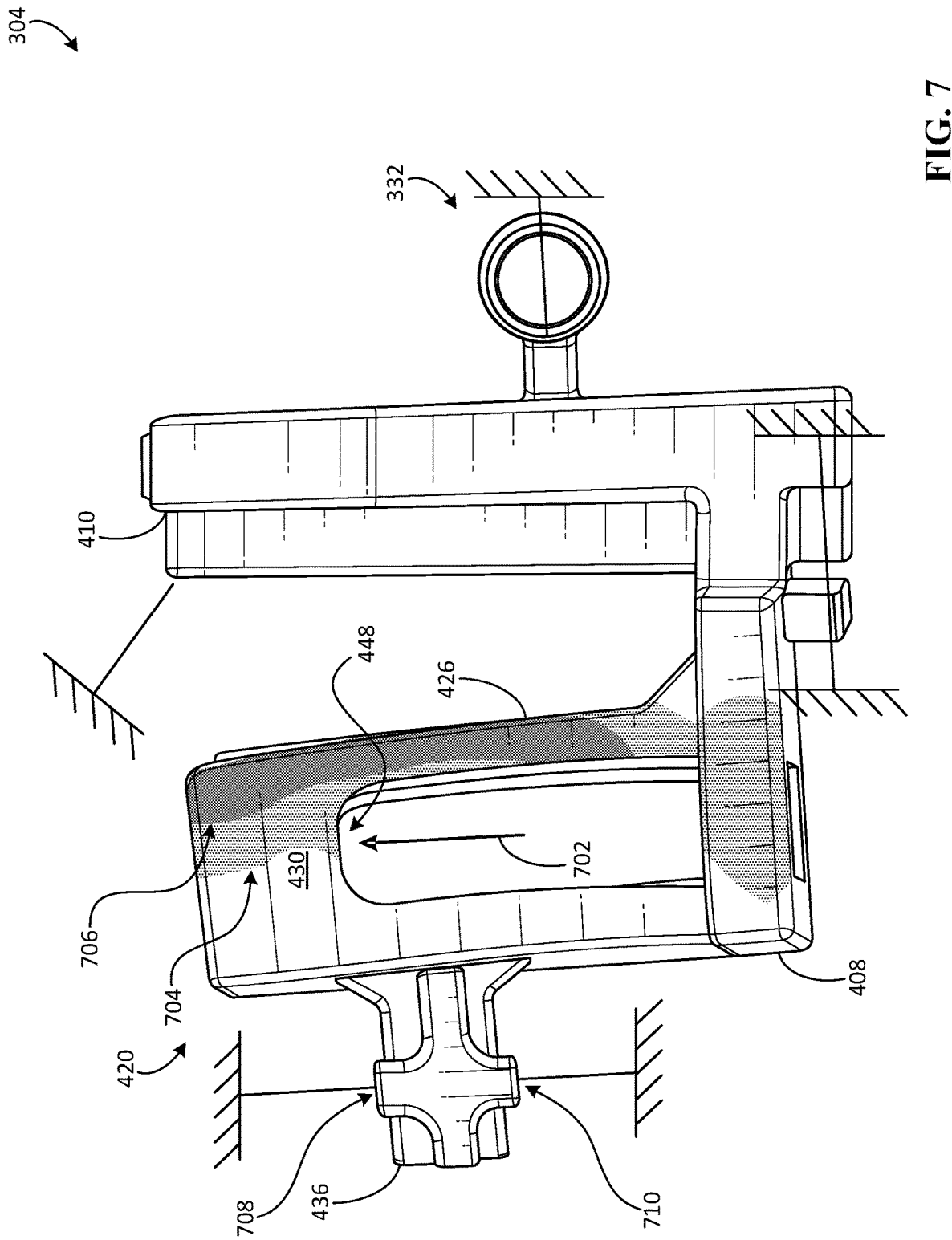
FIG. 7 is another detailed view of the example catch device of FIG. 6 and shows related translational displacement resulting from certain loading conditions.

FIG. 7 is another detailed view of the example catch device 304 and shows related translational displacement resulting from certain loading conditions. In FIG. 7, an example load 702 is applied to the catch portion 430 of the structure 420, which may cause the catch device 304 to elastically deform by slightly bending, twisting, etc. As previously described, the adapter 324 can provide such a load during and/or after the sunroof closing operation. The catch device 304 of FIG. 7 has moderately displaced areas 704 on part of the base 408 and/or the catch portion 430, as represented by the light dotted shading in FIG. 7. The moderately displaced areas 704 correspond to translational displacement magnitude values substantially 1 millimeter (mm) or less. Further, the catch device 304 also has relatively high displaced areas 706 (in comparison to other areas of the catch device 304) on part of the first support portion 426 and/or the catch portion 430, as represented by the dark dotted shading of FIG. 7. The relatively high displaced areas 706 correspond to translational displacement magnitude values substantially between 1 mm and 1.24 mm. In some examples, a maximum translational displacement magnitude of the catch device 304 is 1.24 mm or less.

Additionally, the catch device 304 of FIG. 7 has certain constrained or holding areas that are substantially prevented from moving in certain directions due to engagement with the rail 303, which can be located on any of the second receiver 332, the base 408, the primary wall 410, the guide 436, etc. For example, first and second holding areas 708, 710 of the catch device 304 may be located on the guide 436. In particular, the first and second holding areas 708, 710 are relatively close to and/or adjacent to the contact area 448 to which the second load 434 is applied, which reduces forces transmitted through the catch device 304.

FIG. 8 is a detailed view of a different sunroof component 800 and shows related translational displacement resulting from certain loading conditions. Similar to the illustrated example of FIG. 7, the example load 702 is applied to a portion 802 of the sunroof component 800 associated with catching a sunroof bracket. However, the sunroof component 800 of FIG. 8 does not include the aforementioned structure 420. As a result, when under such a load, the sunroof component 800 substantially bends, twists, etc. In FIG. 8, the sunroof component 800 has moderately displaced areas 804 represented by the light dotted shading of FIG. 8. The moderately displaced areas 804 of FIG. 8 correspond to translational displacement magnitude values substantially 10 mm or less. Further, the sunroof component 800 also has relatively high displaced areas 806 represented by the dark dotted shading of FIG. 8. The relatively high displaced areas 806 correspond to translational displacement magnitude values substantially between 10 mm and 13.6 mm. Thus, the aforementioned catch device 304 out performs the sunroof component 800 shown in FIG. 8 by a factor of about 10.

It will be appreciated that the systems, apparatus, and methods disclosed in the foregoing description provide numerous advantages. Examples disclosed herein provide catch devices that can be used to advantageously secure a panel of a sunroof when the sunroof is closed and/or prevent leaks associated with bracket deflection. Examples disclosed herein provide for more compact and/or lightweight sunroof architecture while improving holding performance associated with such sunroof devices.

Although certain example systems, apparatus, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. An assembly for a sunroof of a vehicle, comprising:
   a sunroof panel;
   a rail extending in a length direction of the vehicle, the rail including multiple guide channels to receive and guide movable sunroof components;
   a bracket beneath the sunroof panel and connected to a side portion of the sunroof panel, the bracket including a first end that is a pivot point of the bracket and a second end opposite to the first end;
   an adapter coupled to the bracket proximate to the second end;
   a drive mechanism slidably coupled to the rail and connected to a part of the bracket between the first end and the second end of the bracket, movement of the drive mechanism along the rail moving the bracket between a first position in which the sunroof is closed and a second position in which the sunroof is open; and
   a catch device slidable along the rail relative to the adapter, the catch device including:
      a base slidable along a bottom surface of the rail,
      a primary wall extending upward from the base and connected to a sunroof cable, and a structure attached to the base, the structure including a first support portion extending upward from the base at a side of the base opposite to the primary wall, a second support portion slidable on the rail and spaced from the first support portion, and a catch portion connected between upper ends of the first and second support portions, the first support portion, the second support portion, and the catch portion, together, defining a channel that extends through the structure configured to receive the adapter when the bracket is in the first position, and when the adapter is in the channel, the structure is configured to engage the adapter to maintain the bracket in the first position and resist deflection of the bracket.

2. The assembly of claim 1, wherein a cross-sectional area of the structure is U-shaped.

3. The assembly of claim 1, wherein the first and second support portions of the structure, together, are configured to resist a load applied to the catch portion by the adapter.

4. The assembly of claim 3, wherein the structure includes ribs arranged on the catch portion to distribute stress in the structure resulting from the load.

5. The assembly of claim 3, wherein the structure includes a first contact surface on part of the catch portion internal to the structure, the first contact surface configured to slide against a second contact surface on the adapter as the adapter passes into the channel.

6. The assembly of claim 5, wherein each of the first and second contact surfaces has an area that is inclined or curved.

7. The assembly of claim 1, wherein a height of the structure is substantially equal to a height of the primary wall.

8. The assembly of claim 1, wherein the catch device includes a guide that projects from a side of the second support portion, the guide configured to engage part of the rail to further restrict deflection of the bracket.

9. The assembly of claim 8, wherein the guide is positioned between a proximal portion of the structure and a distal portion of the structure.

10. The assembly of claim 9, wherein the guide is closer to the distal portion than the proximal portion.

11. The assembly of claim 8, wherein the guide is adjacent a contact area of the structure to which the adapter applies a load.

12. The assembly of claim 1, wherein the catch device includes a first protrusion that projects from the base slides along a second protrusion that projects from the bottom surface of the rail.

* * * * *